No. 870,798. PATENTED NOV. 12, 1907.
A. J. RISKEY.
OIL GAS GENERATOR.
APPLICATION FILED FEB. 19, 1907.
2 SHEETS—SHEET 1.
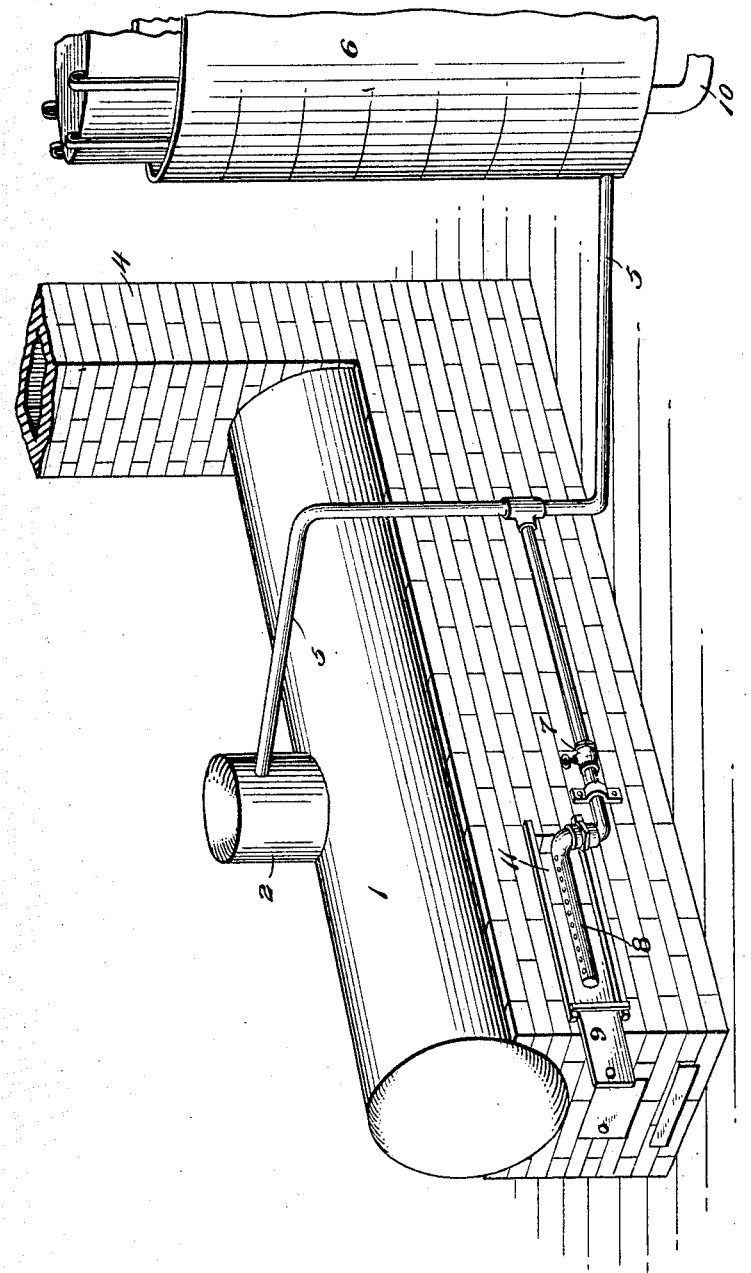

No. 870,798. PATENTED NOV. 12, 1907.
A. J. RISKEY.
OIL GAS GENERATOR.
APPLICATION FILED FEB. 19, 1907.
2 SHEETS—SHEET 2.
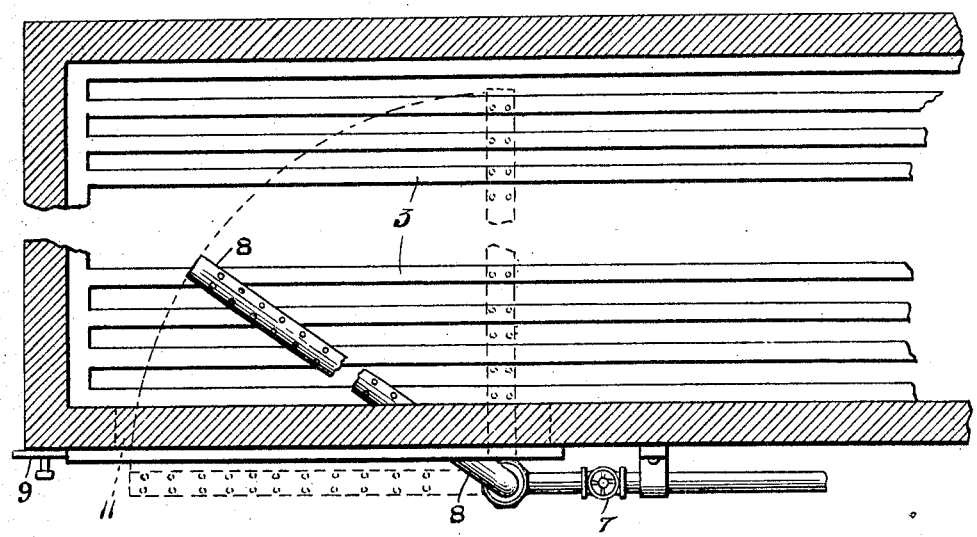
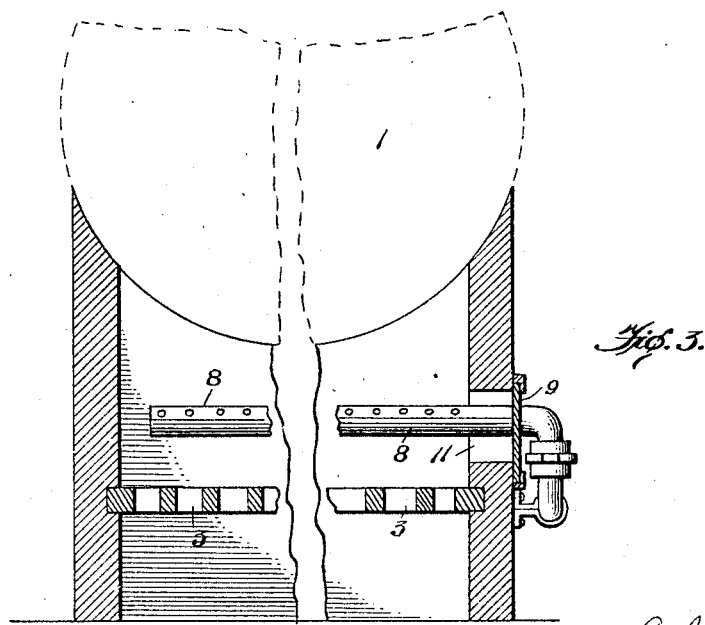

UNITED STATES PATENT OFFICE.

ANDREW J. RISKEY, OF TROY, NEW YORK.

OIL-GAS GENERATOR.

No. 870,798.

Specification of Letters Patent.

Patented Nov. 12, 1907.

Application filed February 19, 1907. Serial No. 358,220.

*To all whom it may concern:*

Be it known that I, ANDREW J. RISKEY, a citizen of the United States, residing at Troy, in the county of Rensselaer and State of New York, have invented a new and useful Gas-Generator; and I do hereby declare the following to be a full, clear, and exact description of the invention, such as will enable others skilled in the art to which it appertains to make and use the same.

This invention relates to vapor producing apparatus and it has for an object to provide an apparatus by which vapor may be produced from kerosene oil.

A further object is to provide an apparatus which may be heated by the vapor thus produced.

With these and other objects in view, the invention consists of the parts and combinations of parts hereinafter described, shown in the accompanying drawings and pointed out in the appended claims.

In the drawings Figure 1 is a perspective view of my apparatus. Fig. 2 is a view showing the manner in which the burner passes through the wall of the fire pot. Fig. 3 is a sectional view showing the burner as it appears within the fire pot.

Referring more particularly to the drawings, 1 indicates a tank for containing kerosene oil. This tank may be of cylindrical form as shown in the drawing and is provided at its top, with a vapor space 2. The tank is initially heated by a fire built on a grate 3 located below the tank, the products of combustion passing out through smoke stack 4. Upon heating the tank while it contains kerosene, vapor rises into vapor space 2 and is conducted by a pipe 5 to a gasometer 6, having a rising and falling bell. From the gasometer the vapor passes to service pipe 10. After a sufficient quantity of vapor has been produced, the fire on grate 3, is permitted to die out and then the valve 7 is opened to allow the vapor to pass to burner 8, the vapor issuing from the burner when ignited heating the tank in the same manner as the fire on the grate 3.

To prevent the burner being affected by the heat of a fire made upon the grate and also to prevent the burner being clogged by clinkers or dust, the burner is mounted to swing through an elongated horizontal opening 11 in the side of the fire pot, a sliding door 9 serving to close all the opening when the burner is swung entirely out of the fire pot or to close a portion of the opening when the burner is positioned within the fire pot.

Having thus described my invention what I claim and desire to secure by Letters-Patent is:

The combination with a fire-pot of a kerosene tank, mounted thereon, a fire grate disposed beneath the tank and having bars lying parallel with the length of the fire pot, said gasolene tank having a vapor dome projecting from its upper circumference, a gasometer tank to cooperate with the said dome, a pipe connecting said dome and the gasometer tank thereby forming communication therebetween, a valve controlled pipe fastened to the sides of the fire pot, having one of its ends connected to the said pipe, forming communication therewith, while its other end is provided with a burner, said burner being swiveled to the said valve-controlled pipe, said fire pot having an elongated horizontal opening, a sliding closure therefor, said opening having flanges to receive the closure for guiding the same, said burner mounted to be swung into and out of the fire pot, through the said opening and when swung into the fire pot, lies above the fire grate and at right angles to the bars thereof.

In testimony whereof I have signed my name to this specification in the presence of two subscribing witnesses.

ANDREW J. RISKEY.

Witnesses:
PHILIP B. FARLEY,
GEORGE J. WATSON.